United States Patent [19]

Knight

[11] Patent Number: 5,187,893

[45] Date of Patent: Feb. 23, 1993

[54] WIRE MESH LOBSTER TRAP LAUNCH STEADYING DEVICE

[76] Inventor: Richard S. Knight, P.O. Box 944, Ogunquit, Me. 03907

[21] Appl. No.: 652,138

[22] Filed: Feb. 7, 1991

[51] Int. Cl.⁵ ............................................. A01K 69/00
[52] U.S. Cl. ....................................... 43/100; 43/6.5; 43/103
[58] Field of Search ................. 43/6.5, 100, 102, 103, 43/104, 105; 294/75; 24/908, 129 A, 129 R

[56] References Cited

U.S. PATENT DOCUMENTS

| | | | |
|---|---|---|---|
| 3,707,022 | 12/1972 | Diehl | 24/129 R |
| 3,722,126 | 3/1973 | Whipple | 43/6.5 |
| 4,799,296 | 1/1989 | Rasmussen | 294/75 |

Primary Examiner—Kurt Rowan
Attorney, Agent, or Firm—Laforest S. Saulsbury

[57] ABSTRACT

A lobster trap launch steadying device adapted for use with lobster traps that will reliably locate the position of attachment of the warp rope used for launching the trap into the sea so the trap will be steadied in its descent to the sea bottom so that the trap will be landed in an upright manner on the sea bottom. Upon a quick pull of the warp rope, the rope will be detached from the snap-clip device and the trap pull upwardly from one of its end portions so that it can be easily landed over the side of the boat. The snap-clip lever part is biased to a closed position by an elastic tension cord that is fixed to one of the mesh bars rearwardly up the full device. The device itself is assembled in clip fashion to the mesh top of the lobster trap.

10 Claims, 4 Drawing Sheets

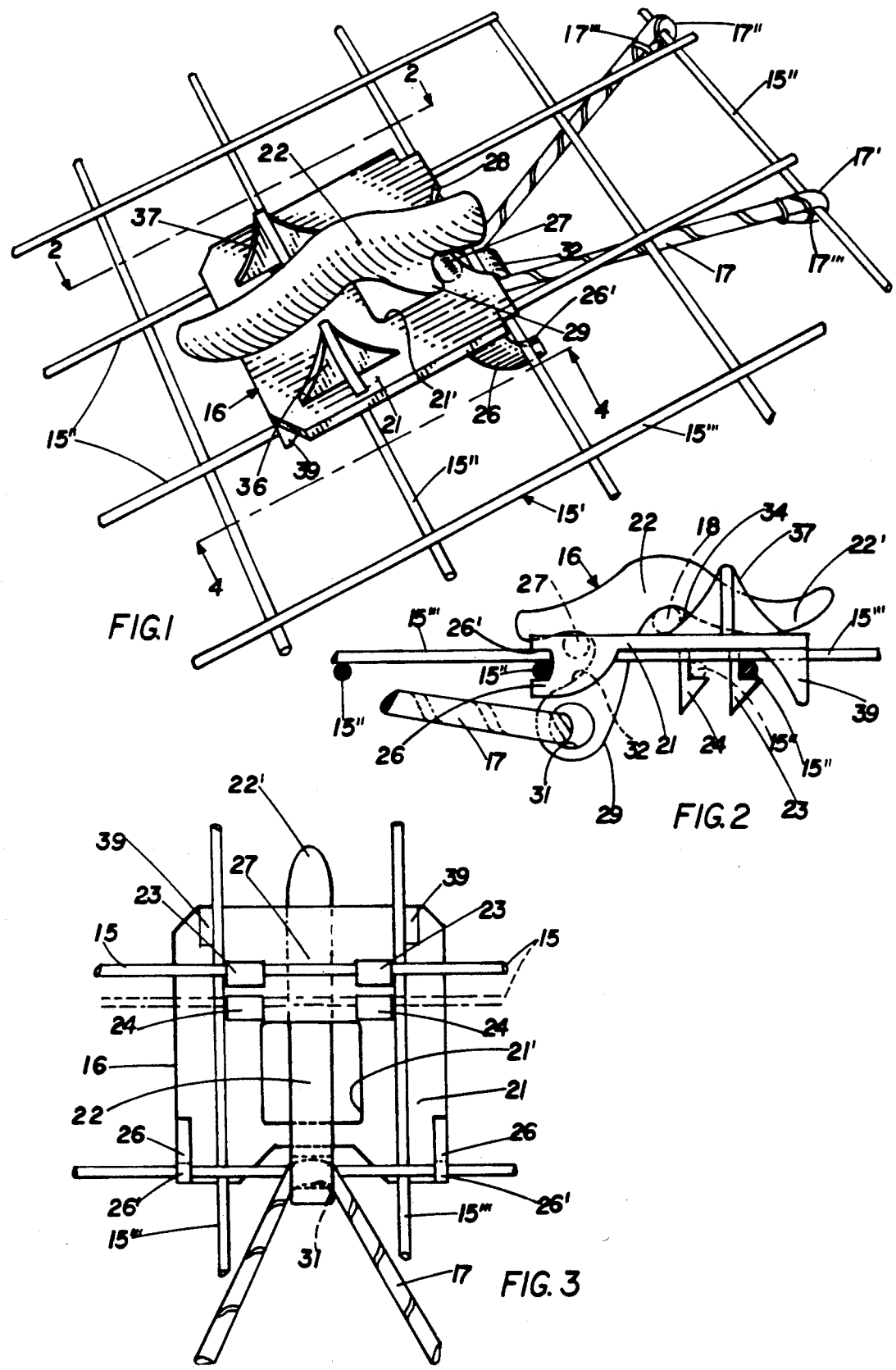

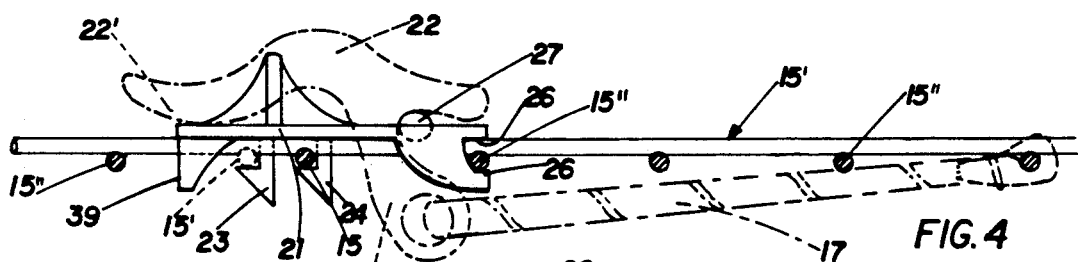
FIG. 4
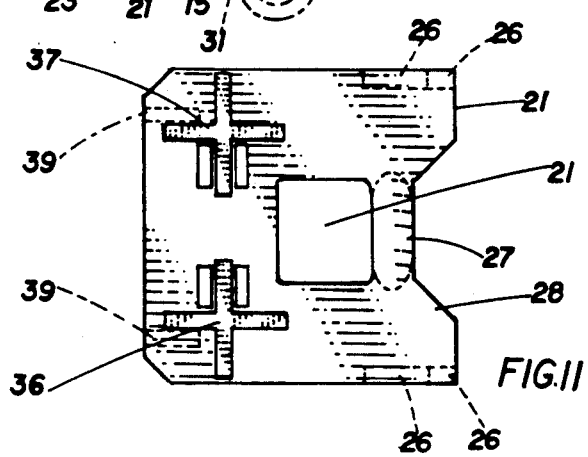
FIG. 11
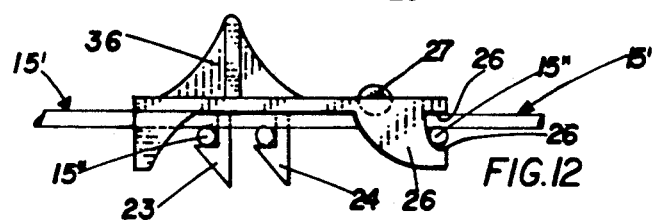
FIG. 12
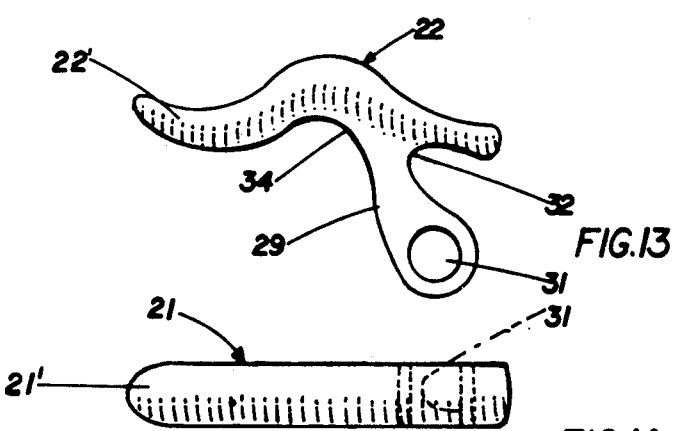
FIG. 13
FIG. 14

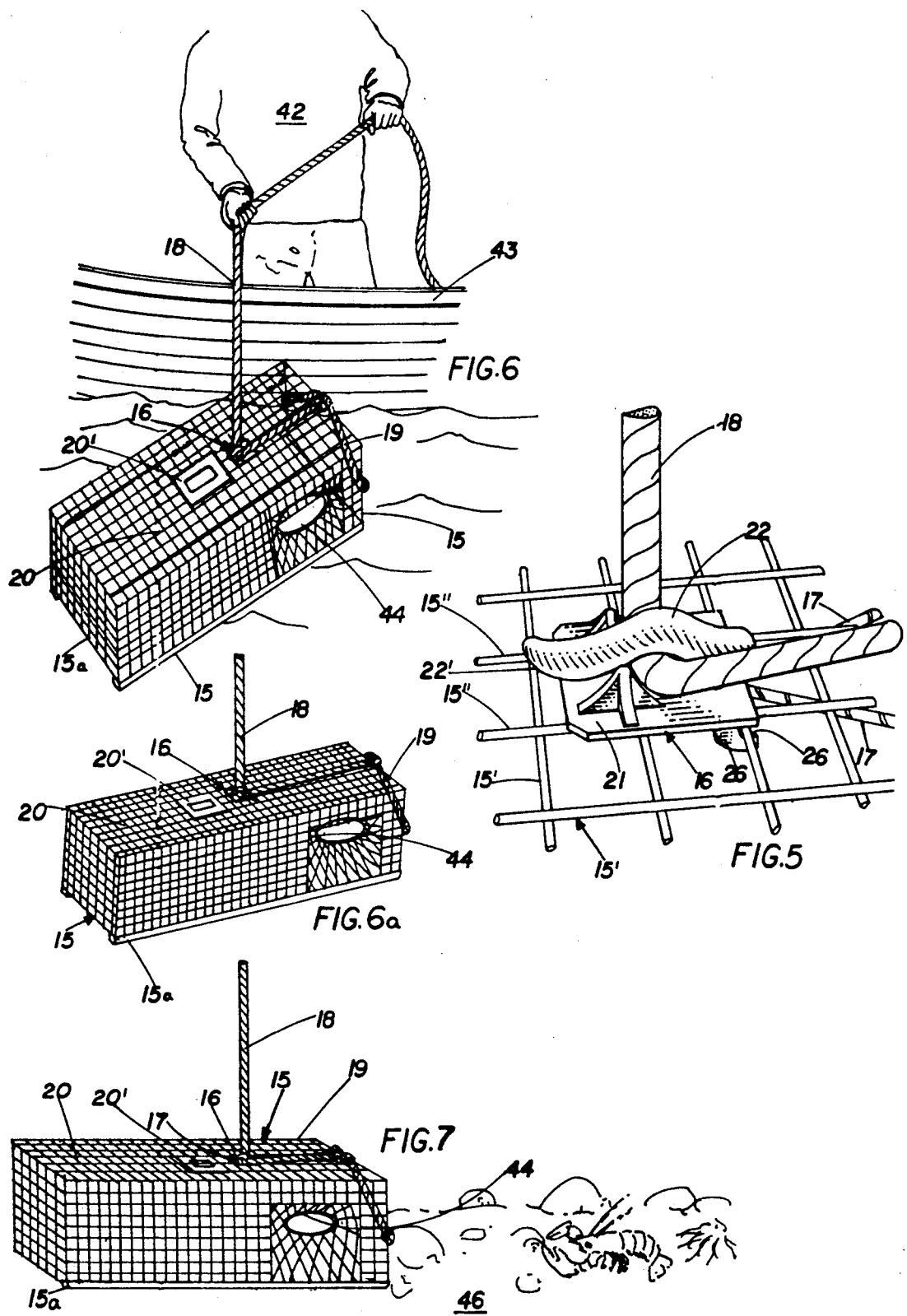

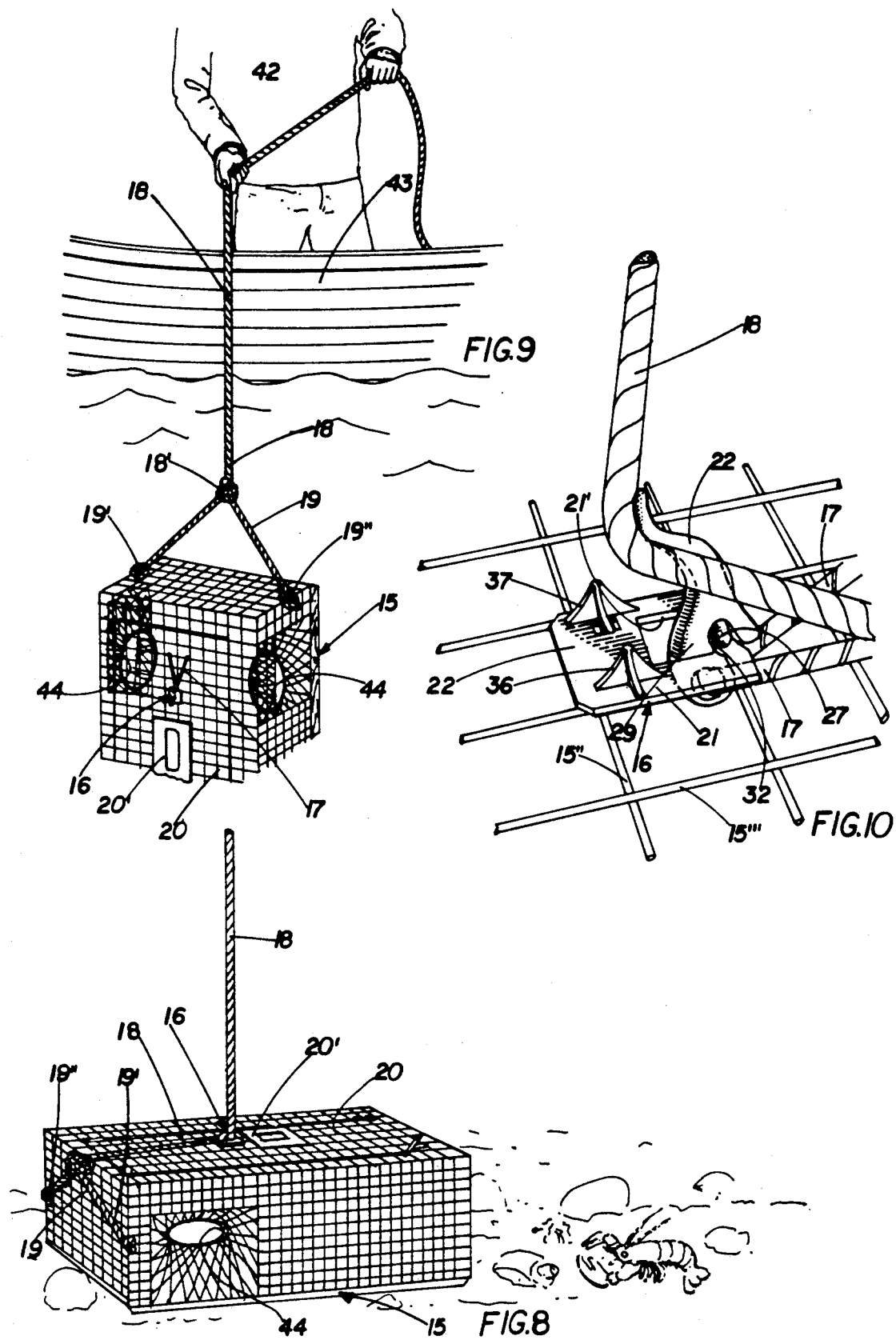

WIRE MESH LOBSTER TRAP LAUNCH STEADYING DEVICE

This invention relates to wire mesh lobster traps and more particularly to a rope retaining clip for steadying the trap on being lowered to the sea floor.

For the few years that vinyl-coated metal wire lobster traps have been used for trapping lobsters on the sea floor, there has been difficulty in landing the traps in an upright manner upon the reopen on lowering the trap with the long warp rope. Wood and wire traps are steadied by their buoyancy on being lowered by rope into the sea. The inherent negative buoyancy of steel mesh relative to wood causes a faster descent of the steel trap than the now nearly antiquated wood trap.

These present steel lobster traps are fitted with a rope bridal that extends across one of its ends and a warp or rope extending from the bridal intermediate its length and by which the trap is lowered into the sea and raised from the sea bottom. This rope arrangement facilitates the proper handling and landing of the trap upon the rail of the boat when the trap is pulled from the sea. As the trap is thrown overboard into the water for descent, the warp rope is dragged at such high rate of speed as to increase the resistance to travel of the trap through the water and that tends to upset stable attitude of the trap on its way to the sea floor. Thus the trap often lands upside down or improperly upon the sea bottom making the entry of a lobster through its access openings difficult or impossible.

It is thus the principal object of the present invention to provide means for use with lobster traps which will steady the descent of wire mesh lobster traps and ensure that the trap will be landed upright upon the sea bottom.

It is another object of the invention to provide steadying means for use in the launching or lowering of lobster traps which is in the form of a quick detachable snap-clip device attachable to the wire mesh and that is further so designed that the snap-clip lever merely rests upon the pivot bar portion of the base plate and the tension cord while resisting pivot motion of the snap lever part being sprung for the device upon the mesh top portion of the trap.

It is another object of the invention to provide releasable snap-clip means for the warp rope that is placed upon the top of the mesh trap to hold the trap in balance with the rope as the trap is lowered to the sea bottom and landed with its bottom down but which will release with a quick pull of the rope from the device as the trap is to be raised to permit the trap to be pulled upwardly from its end and easily landed over the side of the boat.

Other objects of the invention, having the above objects in mind, are to provide a releasable rope snap-clip device for wire mesh lobster trap which is of simple construction, a minimum number of parts, easy to install upon the mesh trap, restrained by heavy elastic cord, of pleasing appearance, easy to operate, effective and efficient in use.

The invention generally comprises a rope releasable snap-clip device that is mountable upon a center point of the top of the wire mesh trap and that is adapted to releasably retain the warp rope intermediate the length of trap while lowering the trap to the sea bottom and thereby keep the trap upright throughout its descent so that proper landing of its bottom on the sea floor is ensured. The rope through its bridal is directly attached to one end of trap and the trap will hang from its end for easy pulling it over the side rail of the boat. The rope prior to the pulling of trap will, with a quick pull, release the rope from the device so the trap can be pulled up from its end to the sea surface and over the side of the boat.

The rope will be clipped into the device upon the top of the trap while resting on the side of the boat when the fisherman will place the warp rope from the bridal under the pointed end of the snap-clip device. Pulling on the warp rope, using very little pressure and with one hand, the fisherman entraps the warp rope under the snap-clip. The trap is then launched and the resistance of the rope through the water force acts as a rudder as the trap descends to the sea floor so the trap is thereby steadied and lands on its bottom and not bottom side up.

The device generally comprises a base part that is snapped into the mesh and retained thereon by depending spring hook projections and a snap part pivoted upon the base and biasingly closed thereon by an elastic cord. The warp rope is extended under the snap-clip part and held by the tension of the elastic cord, so that the rope resistively follows the trap to the sea floor. When the trap is to be hauled, a quick pull of the warp rope overcomes the tension on the elastic cord holding the snap-clip closed allowing the warp rope to be released so that the trap can be hauled upwardly by its bridal and over the side of the boat in the traditional manner. The two device parts will be molded from plastic or metal and the elastic cord, as known in the trade as Bungi cord, that is a cord of elastic with a Nylon covering.

For a better understanding of the invention reference may be had to the following detailed description taken in connection with the accompanied drawing in which FIG. 1 is a top perspective view of a fragment of a wire mesh lobster trap with the snap-clip device of the present invention assembled thereto with the elastic cord to the door in the top of the trap.

FIG. 2 is a rear elevational view of the device as viewed on line 2—2 of FIG. 1.

FIG. 3 is a plan view looking upwardly from within the trap upon the bottom of the base plate and with the elastic cord extended through and from the clip part.

FIG. 4 is a longitudinal sectional view taken on line 4—4 of FIG. 1 and looking in elevation upon the clip device.

FIG. 5 is a top perspective view of a fragment of the top of the mesh lobster trap and of the device with the warp rope extended through the device preparatory to its launching into the sea.

FIG. 6 is an illustrative perspective view of a lobster trap with the warp rope having been assembled to the clip device from the side of the boat by the fisherman preparatory to its release to the sea, the trap assuming an inclined pitch that is maintained as the trap is lowered to the sea bottom.

FIG. 6a is a top perspective view of the trap in partial descent to the sea bottom.

FIG. 7 is a top perspective view of the trap fully landed upon the sea bottom with a lobster looking for access to it to devour its bait.

FIG. 8 is an illustrative perspective view of the lobster trap lying upon the sea bottom with the fisherman thereabove in a boat with the tope taut and about to quick pull the rope to upend the trap for the pull at the trap to the edge of the boat.

FIG. 9 is a fragmentary perspective view of the upended lobster trap partially raised being pulled upwardly from bridal end by the fisherman thereabove.

FIG. 10 is a top perspective view of the device having been opened with the quick pull of the warp rope and the rope released and made ready to use for pulling the trap as illustrated in FIG. 9.

FIGS. 11 and 12 are respectively top plan and side elevational views of the base plate part of the device.

FIGS. 13 and 14 are respectively side elevational and top plan views of the snap-clip part free of the base plate.

Referring now to the FIGS. 15 represents a vinyl-coated wire mesh lobster trap shown generally in full illustrated in FIGS. 6, 6a, 7, 8 and 9 and that has a top mesh portion 15' to which snap-clip device 16 of the present invention is attached, along with an elastic cord 17 by which the snap-clip device is tensioned to retain warp rope 18 that extends from a bridal rope 19 spanning one end of the lobster trap 15 and by which the lobster trap is upended, lowered to and pulled from the sea. With a mesh door being provided in the top mesh portion 15', that is opened to remove the lobster catch therefrom, the clip device 16 of the invention will be secured to the door that will be opened from one side thereof and locked when closed by any suitable means. A hand grip plate 20' which may be grasped for opening and closing the door is provided therein.

This snap-clip device 16 comprises two parts, a base plate part 21 and a snap-clip part 22 that is pivoted upon the base plate part 21 and held closed thereon by the elastic cord 17 about the warp rope 18 extending from the rope bridal 19. The base plate is adapted to be clipped to the wire mesh top portion 15' in mesh door 20 between two transverse individual mesh bars 15". For this purpose spaced parallel hook projections 23 and 24 depend from the bottom face of the base plate 21. The projection 23 is hooked over a transverse bar 15" of a two-inch square mesh top with the bars two inches apart as shown for all illustrations and the depending hook projection 24 is left available for one and a half inch square mesh when the traps are so formed from such dimension wire mesh are with mesh door 20 being of the small dimension. While the hook projection 23 or 24 will be accommodated by one mesh bar 15", a transverse recess 26 at the forward end of the base plate 21 will accommodate the next parallel bar 15". On sliding the base plate recess 26 over its transverse wire bar and depressing the plate hook projection 23 down over its corresponding bar 15", the base plate and the entire device 16 is made secure to the door 20 in the top 15' of the lobster trap 15. The device on being elongated or increased in size could be extended between spaced bars 15" with a bar 15" cut away to provide more space between mesh bars 15" for such larger size mesh device.

Base plate 21 has an intermediate square hole 21' closed at one end by a reduced diameter bar portion 27 leaving a cut-away edge 28 and over which the snap-clip lever part 22 is placed to pivot upwardly from the base plate 21 against the tension of the elastic cord 17. On the rear end of the snap-clip 22 is long drop or depending portion 29 through which is a lateral hole 31 that accommodates the elastic cord 17 running therethrough. The clip depending portion 29 is recessed at 32 to accommodate the pivot bar portion 27 of the base part 21 and in which it is restrained by elastic cord 17 pulling rearwardly upon the snap-clip lever being bowed upwardly to accommodate the warp rope 18.

Extended forwardly on is clip lever 22, a raised lip 22' that extends over the edge of the base plate to facilitate the extension of the warp rope 18 thereunder and rearwardly into position within and upwardly bowed area 34 of the snap-clip 22. The snap clip part 22 extends forwardly between spaced crossed triangular raised protrusions 36 and 37 which restrict but does not prevent some sliding movement of the warp rope 18 as it is applied and released from the snap-clip device. It can be seen that the elastic cord holds the snap-clip lever 22 upon the base plate 21 and continues to hold the device itself to the top mesh portion 15'.

The rear end of the base plate has spaced depending projections 38 and 39 that slide down over spaced longitudinal-extending wire mesh bars 15''' to retain the device against lateral shifting upon the mesh top 15' of the lobster trap 15.

The elastic cord 17 is waterproofed with a plastic covering and is elongated on running through the hole 31 in the depending portion of the snap-clip lever to be connected at its ends by respective loops 17' and 17" with a twisted wire 17''' thereabout, FIG. 1. The loops are spaced and extended over a cross bar 15" of the top 15' of the trap several mesh squares distant from the snap-clip device 16 already fixed thereto. The elastic cord 17 pulls the snap-clip part 22 to a closed position about the warp rope 18, FIG. 5. The bridal rope 19 is connected across the end of the lobster trap and the ends are respectively fixed thereto in a suitable manner at 19' and 19", FIGS. 8 and 9. The warp rope 18 is fixed at 18' intermediate the length of the bridal rope to effect a pull thereupon to launch and pull the lobster trap.

In operation, the fisherman 12 in boat 43 will have run warp cord 18 under lip 22' of snap-clip 22 to be attached in the manner best seen in FIG. 5 and retained by tension of elastic cord 17 upon the sanp-clip lever. The lobster trap 15 will have been baited and as it is held by the attachment of the warp rope made to the clip device retained on the trap top 15' a central location between the side of the trap and removed from the longitudinal middle closer to one end of the trap than to the far end. In this connection the trap as it is submerged will be inclined with its far end 15a down and so held as it is lowered by the fisherman 42 and upon this far end 15a striking sea bottom 46 to come to rest thereon in a upright manner with the holes 44 in the trap accessible to lobsters crawling along the sea bottom. This is best illustrated in FIGS. 6, 7 and 8. Control of the lobster trap in its descent will not have been lost and upright landing of the trap upon the sea bottom is ensured. The warp rope 18 will still remain hitched to the clip device 16 until it is quick pulled to raise the trap.

When the catch of lobster is to be pulled the warp rope 18, the rope will have been gathered from a buoy by which the rope has been maintained from the sea surface to mark the location of the trap thereunder on the sea bottom 46. The procedure of pulling the trap from the sea bottom is best illustrated in FIGS. 8 and 9. With rope in hand the fisherman will make a quick yank upon the rope 18 to free it from the snap-clip device upon the top 15' of the trap 15. With pull the trap will be upended on its far end 15a and pulled by its bridal 19 in the manner shown in the raised position in the sea water in FIG. 9. The trap will reach the boat edge and will be pulled in a flat manner over the side of the boat and thereinto from where the entangled lobsters upon opening mesh door 20 by its handle 20', will be taken from the top of the trap through the door opening there.

It should now be apparent that there has been provided a way of easing the handling of the more heavy metal mesh lobster traps in the sea water and that their proper placement, upon being launched, will be had upon the sea bottom.

While various changes may be made in the detail construction, it should be understood that such change will be within the spirit and scope of the present invention as defined by the appended claims.

What is claimed is:

1. In combination, a metal wire mesh lobster trap having a mesh top, bottom and end portions and a warp rope means attached to one of the end portions by which the trap is launched into the sea and pulled therefrom, and a snap-clip device secured to the top portion intermediate its length and adapted to releasable retain the warp rope in central location removed from its connection with the end portion and to steady the trap in a upright position while being launched from a boat to the sea bottom and to ensure its landing with its bottom resting thereon.

2. The combination as defined in claim 1 and said warp rope means including the bridal rope extended across the end portion of the trap and connected between the sides thereof and a warp rope connected to the bridal rope intermediate its length between the trap sides.

3. The combination as defined in claim 1 and said snap-clip device including a base plate part detachably connected to and between mesh wires of the top portion, a snap-clip part pivoted upon the base plate and an elastic tension cord connected between the snap-clip part and wires of the top mesh portion to retain the snap-clip closed upon the base plate while permitting the warp rope to be extended and retained thereunder and yet releasable therefrom when a quick pull is made upon the warp rope as when the trap is to be pulled from the sea bottom.

4. The combination as defined in claim 3 and said base plate having a central opening and a pivot bar portion extended thereacross, said snap-clip part pivoted over the bar portion and having a depending portion down through the central opening and said elastic cord being connected to the depending portion of the snap-clip below the base plate and within the top portion of the trap to hold the snap-clip upon the bar portion whereby the snap-clip may be lifted to facilitate the extension of the warp rope thereunder.

5. The combination as defined in claim 4, said snap-clip being bowed upwardly to further accommodate the warp rope between the parts and said snap-clip having a forwardly extending turned up lip for facilitating the engagement of the warp rope being extended thereunder.

6. The combination as defined in claim 5 and spaced raised triangular shaped projections on the base plate and said snap-clip extending therebetween and said snap-clip extending longitudinally between the spaced raised projection to restrict but not prevent sliding movement of the warp rope as it is applied and released from the snap-clip device.

7. The combination as defined in claim 3 and said detachable base plate part having longitudinally-spaced depending hook portions available for respective engagement with respective wires of different size mesh squares of the top portion of the mesh trap.

8. The combination as defined in claim 7 and said base plate including transversely-spaced depending portions from one end thereof and respectively having longitudinally-extending recesses for accommodating a transverse mesh bar on assembly of the snap-clip device to the top portion of the lobster trap.

9. The combination as defined in claim 8 and said base plate further including transversely-spaced extending depending portions adapted to overlie spaced longitudinally-extending mesh bars of the top portion of the lobster trap to retain the snap-clip device against lateral displacement thereover.

10. The combination as defined in claim 3 and the base plate part having a pivot bar portion, said snap-clip lever for its pivot connection with the pivot bar portion merely resting thereupon and said elastic tension cord not only resisting the pivoting of the snap-clip lever part but continues through the base to hold the entire device upon top mesh portion and the part thereof against disassembly from one another and the device from detachment from the top portion.

* * * * *